United States Patent [19]

Landolt

[11] Patent Number: 5,712,958
[45] Date of Patent: Jan. 27, 1998

[54] ANALOG FUZZY RULE CIRCUIT COMPRISING A NETWORK OF CONTROLLED AND FIXED RESISTORS IN COMBINATION

[75] Inventor: Olivier Landolt, Neuchâtel, Switzerland

[73] Assignee: CSEM Centre Suisse d 'Electronique et de Microtechnique SA - Recherche et Developpement, Neuchatel, Switzerland

[21] Appl. No.: 532,875

[22] Filed: Sep. 22, 1995

[30] Foreign Application Priority Data

Oct. 6, 1994 [FR] France ................................ 94 11957

[51] Int. Cl.⁶ .................................................. G06F 15/18
[52] U.S. Cl. ............................ 395/3; 395/61; 395/900
[58] Field of Search ............................ 395/3, 900, 61

[56] References Cited

U.S. PATENT DOCUMENTS

| | | | |
|---|---|---|---|
| 5,167,005 | 11/1992 | Yamakawa | 395/3 |
| 5,412,752 | 5/1995 | Basehore et al. | 395/3 |
| 5,515,476 | 5/1996 | Nishidai et al. | 395/3 |
| 5,570,456 | 10/1996 | Landolt | 395/3 |
| 5,572,626 | 11/1996 | Lin et al. | 395/3 |

Primary Examiner—Tariq R. Hafiz
Attorney, Agent, or Firm—Griffin, Butler, Whisenhunt & Kurtossy

[57] ABSTRACT

An analog type fuzzy logic controller is adapted to permit the implementation of a set of rules. The controller includes a circuit (B,C) for determining the overall degree of truth of each rule and a circuit (D,E) for determining the values to be supplied at the output. The determination circuit of the overall degrees of truth of the various rules is composed of a network (C) of interconnected resistive elements. Each of the resistive elements is associated with a condition of a rule and is adapted to be commanded in such a way that its conductance is substantially proportional to the degree of truth of the associated condition. The current intensities circulating in the various branches (21,22,23) of the network are representative of the overall degrees of truth of the various rules.

8 Claims, 4 Drawing Sheets

5,712,958

ANALOG FUZZY RULE CIRCUIT COMPRISING A NETWORK OF CONTROLLED AND FIXED RESISTORS IN COMBINATION

FIELD OF THE INVENTION

The present invention relates to a fuzzy logic controller adapted to implement a set of rules in order to provide the values of a set of output variables as a function of values of a set of input variables.

More specifically, the present invention relates to a fuzzy logic controller of the type described hereinabove arranged in the form of an integrated analog circuit.

FIELD OF THE INVENTION

Controllers are already known which operate by implementing fuzzy rules. The concept of a fuzzy rule can be shown by a functional block as illustrated in FIG. 1A.

The rule shown in FIG. 1A has a certain number of inputs with reference $X_k$ and a certain number of outputs with reference $Y_j$. These inputs and outputs constitute respectively the components of an input vector designated $\vec{X}$ and of an output vector designated $\vec{Y}$. A fuzzy logic controller always jointly implements a set of rules and all the rules of the set generally have the same inputs and the same outputs. FIG. 1B shows in functional manner a fuzzy logic controller implementing a set of three rules.

A fuzzy logic controller has first circuits, represented by a set of blocks reference 3, which serve to determine an overall degree of truth for each of the rules implemented. This overall degree of truth is designated $\mu_i$, the index i taking the values 1, 2 and 3 in FIG. 1B. The overall degree of truth of a fuzzy rule is, in concrete terms, a measure of the degree of similarity between the values adopted by the components $X_k$ of the input vector $\vec{X}$ and the reference values $p_{ik}$ inherent in the rule.

A fuzzy logic controller also has second circuits, represented by a set of blocks reference 5, which determine the output values $Y_j$ by combining predetermined values $a_{ij}$ and the overall degree of truth $\mu_i$ which are associated with a rule having the corresponding values associated with the other rules. The predetermined values $a_{ij}$ associated with a specific rule form the components of a vector $\vec{a}_i$ and the operation of implementation to effect the combination of vectors $\vec{a}_i$ is, in the commonest case, the calculation of a centre of gravity of the $\vec{a}_i$ where the weight $\mu_i$ is attributed to each $\vec{a}_i$.

Overall, the implementation of a set of associated rules makes it possible to define a non-linear function $\vec{Y}(\vec{X})$ region by region. Indeed, each rule specifies the value adopted by the output vector $\vec{Y}$ when the input vector $\vec{X}$ is close to the vector $\vec{P}_i$ which is constituted by the reference values $P_{ik}$ of the rule.

DESCRIPTION OF THE PRIOR ART

The issues considered hereinabove are known to the person skilled in the art and more detailed explanations may be obtained by referring to the numerous publications dealing with fuzzy logic. An introduction to fuzzy logic is, in particular, given in the monthly publication "La Recherche"—D. Dubois, H. Prade, LA RECHERCHE, 1308, 22, (1991).

Although the mode of operation of the controller of the present invention could be described without referring to fuzzy logic, we will use the vocabulary and the concepts commonly associated with this formalism to describe its operation.

The rules implemented with fuzzy logic are essentially qualitative and are generally expressed in ordinary language by a statement of the type "IF condition THEN conclusion" or in tabular form. The statement of a rule will generally comprise several conditions and could be presented in a form of the type "IF X is A AND Y is B THEN Z is C" or of the type "IF X is A OR Y is B THEN Z is C" or also in the form of a complex expression obtained by combining the two forms hereinabove. Here, the symbols A, B and C are linguistic terms.

To model a physical system using fuzzy rules, it is necessary to transpose these into numerically evaluable mathematical expressions and such that the dynamics of the system thereby described corresponds in a satisfactory manner to the idea which a human being can acquire thereof on the basis of ordinary language rules. On a theoretical plane, this transposition into quantitative terms can be made using the formalism of fuzzy sets and of fuzzy logic. A fuzzy set permits the convenient representation of values more or less compatible with one of the conditions of a fuzzy rule. A fuzzy set A is characterised by an appertaining function $\mu A(X)$ capable of acquiring values comprising between 0 and 1. The function $\mu A(X)$ is the degree of compatibility of the value taken by the input variable X with the condition "X is A" or, in other words, $\mu A(X)$ is the overall degree of truth of the assertion "X is A".

Where a rule comprises several conditions, the overall degree of truth is determined by combining amongst themselves the degrees of truth of each of these conditions. This operation of combining degrees of truth, that is appertaining functions, can be realised using fuzzy logic operators. The MIN operator and the MAX operator which correspond respectively to the terms "AND" and "OR" in natural language, are by far the most commonly used. Nonetheless, other operators have been defined in theory and can be applied to combine appertaining functions.

The majority of known devices are constructed around a numerical microprocessor. These numerical controllers evaluate the overall degree of truth of a rule using algorithms which faithfully reproduce the method supplied by the formalism of fuzzy logic.

Descriptions of fuzzy logic analog controllers have also been published. Reference is made in particular to the article by M. Sasaki and F. Ueno, "A fuzzy logic function generator (FLUG) implemented with current mode CMOS circuits" Proc. 21st Int. Symposium on multiple valued logic, 1991. The operation of known analog controllers is based on immediate translation of the basic algorithm used with the numerical devices.

Fuzzy logic analog controllers such as those which have just been described present drawbacks. Indeed, the operators conventionally used to evaluate the overall degree of truth of a rule constitute relatively complex circuits when realised in analog form. As a result, on the one hand, these circuits occupy a large area when they are integrated on a chip and, on the other hand, they consume considerable energy.

SUMMARY OF THE INVENTION

One object of the present invention is thus to overcome this disadvantage of the prior art. It achieves this aim by providing an analog type fuzzy logic controller adapted, by implementing a set of rules and as a function of the values from a set of input variables, to supply the values of a set of output variables, each of said rules expressing itself as, on the one hand, a result consisting in the association of predetermined values with at least part of said output variables and, on the other hand, a fuzzy logic expression composed of one or several conditions connected to each other by logic operators, said conditions each consisting of an expression involving one of said input variables and a reference value, said controller determining the values of said output variables by combining said predetermined values of the conclusions of the various rules, the predetermined values of each of said conclusions being weighted by taking into account an overall degree of truth of the corresponding fuzzy logic expression, said overall degree of truth being determined by combining the respective degrees of truth of the conditions appearing in said fuzzy expression and said degree of truth of one condition being maximum when said condition is strictly verified and zero when said condition is considered as non-verified, said controller comprising:

—first circuits for supplying for each rule a current, the intensity of which is representative of the overall degree of truth of the fuzzy logic expression of said rule, and —second circuits for determining the values of said output variables from said current intensities supplied by said first circuits for the various rules.

The controller that is the object of the present invention is, according to a first variant, characterised in that said first circuits have:

—a network of parallel resistive bipoles, said network being disposed in series with a current source and each of said bipoles being associated with one of said rules, said bipoles each being moreover composed of a set of resistive elements interconnected in series and in parallel, the configuration of the interconnections of said resistive elements in a bipole being determined by the nature of the logic operators ("and", "or") present in the fuzzy logic expression of the rule associated with said bipole, —a plurality of evaluation circuits of the degree of truth of a condition, each of said circuits being adapted to command the conductance of one of said resistive elements in such a way that the relative current intensities circulating in the various branches of said network of resistive bipoles reflect the distribution of the overall degrees of truth of the various rules.

According to a second variant of the present invention, said first circuits of said controller have:

—a network of resistive bipoles in series, said network being disposed in parallel with a voltage source and each of said bipoles being associated with one of said rules, said bipoles each also being composed of a set of resistive elements interconnected in series and in parallel, the configuration of the interconnections of said resistive elements in a bipole being determined by the nature of the logic operators ("and", "or") present in the fuzzy logic expression of the rule associated with said bipole, —a plurality of evaluation circuits of the degree of truth of a condition, each of said circuits being adapted to command the conductance of one of said resistive elements in such a way that the relative values of the voltages at the terminals of the various resistive bipoles reflect the distribution of the overall degrees of truth of the various rules.

To facilitate comprehension of the object of the present invention we will initially refer to FIG. 2 which shows two resistive elements in series with references G1 and G2 respectively. The conductance of each of these resistive elements is driven by an evaluation circuit of the degree of truth of a condition. The two evaluation circuits of the degree of truth, or in other words, of the membership function, are symbolised by rectangular boxes with references 11 and 13 respectively. Each of the evaluation circuits is adapted to effect a comparison between the value of the input signal $X_K$ and a reference value $P_k$. The evaluation circuit varies the conductance of a resistive element as a function of the result of this comparison. The conductance is adapted to be substantially zero when the input value is very different from the reference value, to increase continuously when the two values approach each other and to reach a maximum when the two values are identical.

Making $G_1$ and $G_2$ the values of the two conductances, the conductance equivalent to these two conductances in series is given by:

$$G = \frac{1}{1/G_1 + 1/G_2} = \frac{G_1 \cdot G_2}{G_1 + G_2}$$

Amongst the features of this equation, it will be noted that $G$ is approximately equal to $G_1$ when $G_1$ is substantially smaller than $G_2$. There is thus a certain similarity between the function $MIN(G_1, G_2)$ and the above function. It will thus be understood that the extremely simple circuit of FIG. 2 can achieve a vectorial measurement of similarity between an input vector and a reference vector of a rule having two inputs. According to the formalism of fuzzy logic, the function G above corresponds, in ordinary language, to the term "and". It will be seen hereinbelow that the present invention also makes it possible to implement rules, the conditions of which are connected by the term "or".

One advantage of the present invention is its low consumption. In fact, in accordance with the present invention, current only circulates in the branches of the network of resistive elements which correspond to rules, the overall degree of truth of which is not zero.

Since the signals are represented by currents, another advantage is that a controller according to the present invention is able to work with very low voltage.

Another object of the present invention is an analog type fuzzy logic controller adapted by implementing a set of rules and as a function of the values from a set of input variables, to supply the values of a set of output variables, each of said rules expressing itself as, on the one hand, a conclusion consisting in the association of predetermined values with at least one part of said output variables and, on the other hand, a fuzzy logic expression composed of one or several conditions connected together by logic operators, said conditions each consisting of an expression involving one of said input variables and a reference value, said controller determining the values of said output variables by combining said predetermined values of the conclusions of the various rules, the predetermined values of each of said conclusions being weighted, taking into account an overall degree of truth of the corresponding fuzzy logic expression, said overall degree of truth being determined by combining the respective degrees of truth of the conditions appearing in said fuzzy expression and said degree of truth of a condition being maximum when said condition is strictly verified and zero when said condition is considered non-verified; said controller comprising:

—first circuits for supplying for each rule a current, the intensity of which is representative of the overall degree of truth of the fuzzy logic expression of said rule, and —second circuits for determining the values of said output variables from said current intensities supplied by said first circuits for the various rules; said second circuits of said controller having:

—a given number (N) of collecting lines

—for each rule, a current dividing circuit having said given number of branches, each of said branches receiving an equal share of the current supplied by said first means and each of a selection of said branches being connected to one of said collecting lines, said selection of branches expressing said predetermined values appearing in the conclusion of said rule.

Another advantage of the present invention is that, since the output values associated with the rules are represented in an essentially binary form (the selection or not of a branch), it is possible to achieve, for example, integrated circuits that are easily programmable or specialised circuits by pre-programming the predetermined values in the form of short-circuits on one of the conducting layers.

BRIEF DESCRIPTION OF THE DRAWINGS

Other features and advantages of the present invention will emerge from the following description, given solely by way of example and made with reference to the appended drawings, in which:

FIG. 3 shows in diagrammatic form, by way of example, a first embodiment of the controller of the present invention. In this example, the controller is adapted to implement three rules each having two conditions connected by the expression AND.

DETAILED DESCRIPTION OF THE INVENTION

Figure 1A:
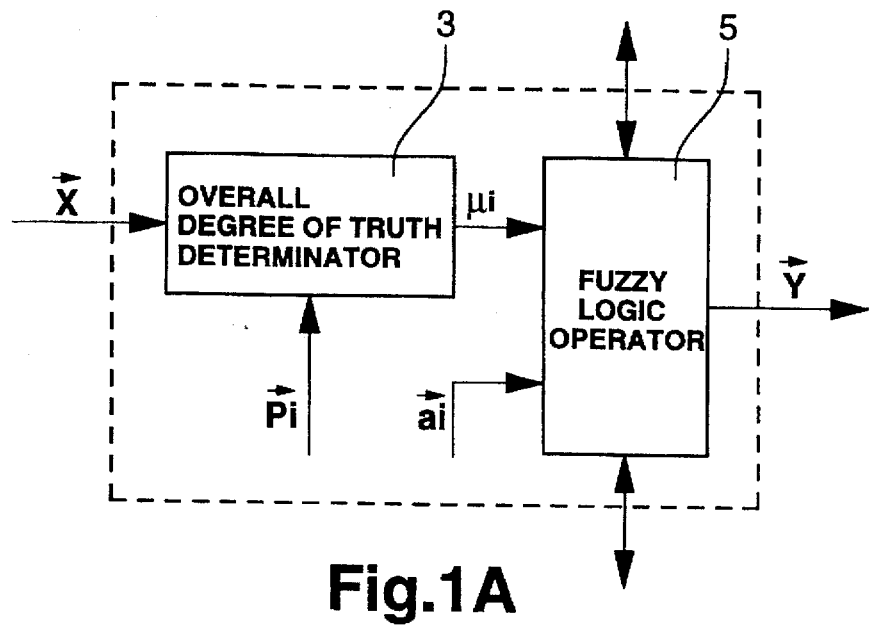
FIG. 1A is a functional block conceptionally showing a fuzzy rule.
Figure 1B:
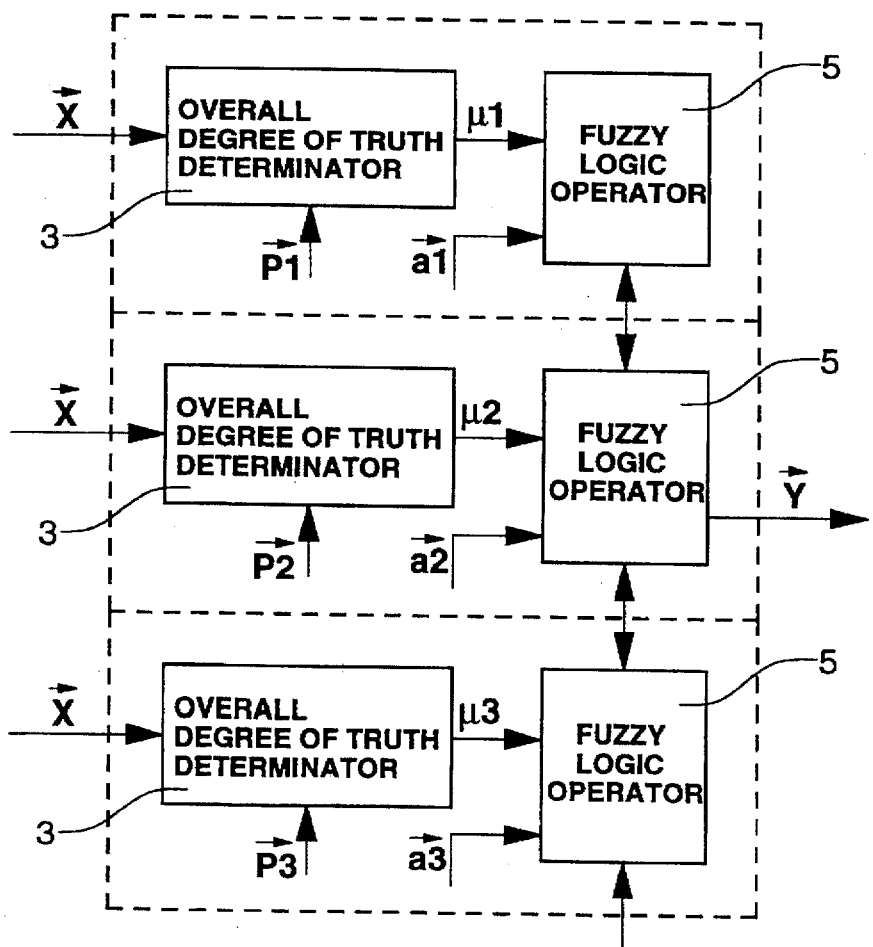
FIG. 1B shows in functional manner an example of a fuzzy logic controller jointly implementing three rules.
Figure 2:
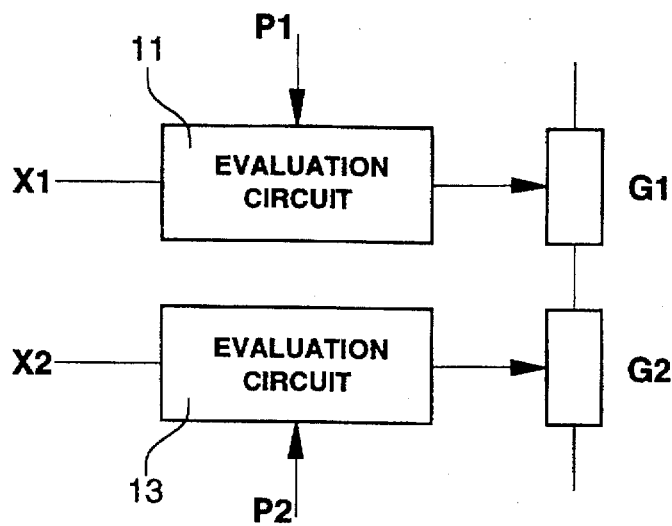
FIG. 2 is a partial representation of a network of resistive elements adapted to implement a measurement of similarity between an input vector and a reference vector of a rule having two inputs.
Figure 3:
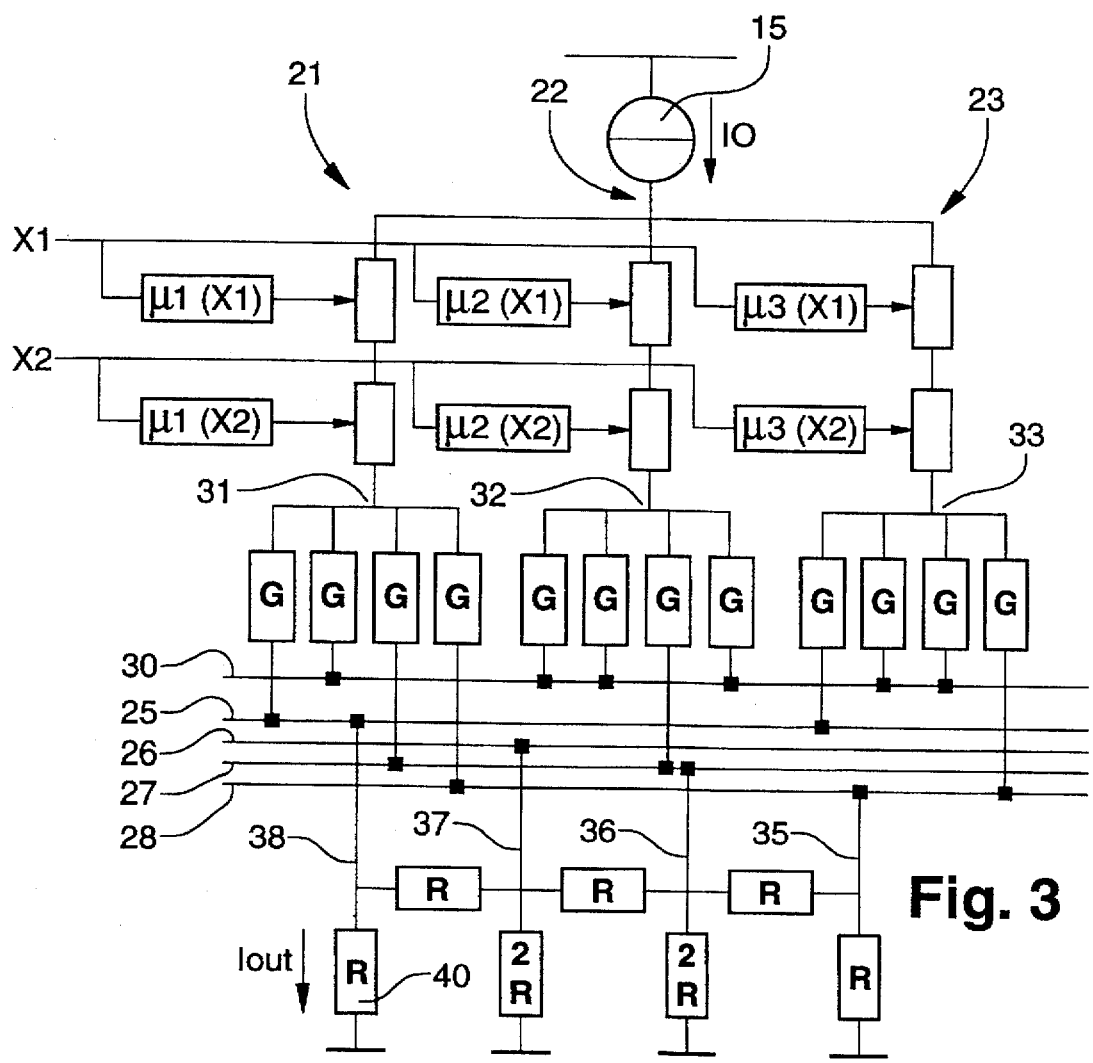
FIG. 3 is the skeleton diagram of a first embodiment of a controller according to the present invention.

It is first of all apparent that the controller has six evaluation circuits of an appertaining function, that is one evaluation circuit of one membership function per condition. In FIG. 3, the evaluation circuits have been shown by rectangular boxes with the references $\mu_1(X_1)$, $\mu_2(X_1)$, $\mu_3(X_1)$, $\mu_1(X_2)$, $\mu_2(X_2)$ and $\mu_3(X_2)$ respectively. Each of the evaluation circuits is adapted to evaluate the membership function by effecting a comparison between, on the one hand, an input signal (either $X_1$ or $X_2$) and, on the other hand, a reference value. The membership function is zero when the input value is very different from the reference value, increases continuously when the two values approach each other and reaches a maximum when the two values are identical.

Figure 4A:
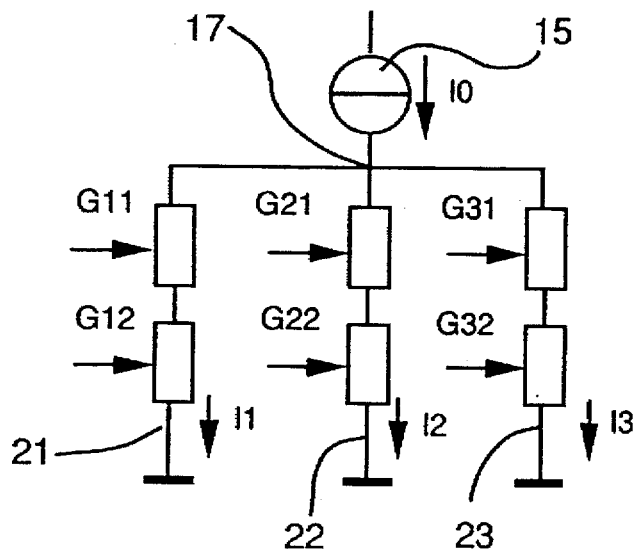
FIG. 4A is a diagram of a first embodiment of a network of resistive bipoles corresponding to the present invention and identical to that shown in FIG. 3.

The controller has, on the other hand, a current source reference 15 connected in series to a network formed of variable conductance resistive elements with references $G_{11}$, $G_{21}$, $G_{31}$, $G_{12}$, $G_{22}$ and $G_{32}$ respectively (see FIG. 4A). The network of resistive elements is formed of three parallel branches, with references 21, 22 and 23 respectively and which each have two resistive elements in series. Each pair of resistive elements in series is associated to the two conditions of a rule. Each resistive element is, moreover, adapted to be commanded by one of the evaluation circuits of an appertaining function so that its conductance is zero when the membership function is zero and so that its conductance is maximum when the membership function is maximum.

The circuit elements of FIG. 3 which have just been described constitute an embodiment of the first means which are claimed in the present invention and which are adapted to supply, for each rule, a current representative of the overall degree of truth of said rule. To make the invention easier to understand, FIG. 4A takes over in isolation features of FIG. 3 which constitute the first means hereinabove.

It will be seen from FIG. 4A that the current source 15 is connected to a node 17 through which it supplies current to the three branches 21, 22 and 23 of the network of variable conductance resistive elements. Under these conditions, if the equivalent conductance of the branch i is designated $G_i$ (either the branch 21, or the branch 22 or the branch 23), the intensity $I_i$ of the current flowing in this branch is given by:

$$I_i = \frac{G_i}{\sum_i G_i} \cdot I_0$$

On the other hand, as shown hereinabove, the effect on the total conductance of a branch $G_i$ of the series arrangement of two resistive elements is similar to the effect of the fuzzy operator "AND" on two appertaining functions. The distribution of the currents $I_i$ between the branches therefore reflects the distribution of the overall degrees of truth or, in other words, the weighting between the various rules. Because this division of the weighting is a normalisation, the sum of the weighting remains constant.

The reasoning which we have just set out on the distribution of the currents in the three branches of the resistive network is only correct provided the extremities of these branches are all three grounded, or at least have the same potential. In the embodiment of FIG. 3, the above condition is virtually respected if the twelve identical resistive elements, which bear the reference G and which can be seen immediately downstream of the resistive network, have a much higher conductance than the variable conductances of the resistive network.

Figure 4B:
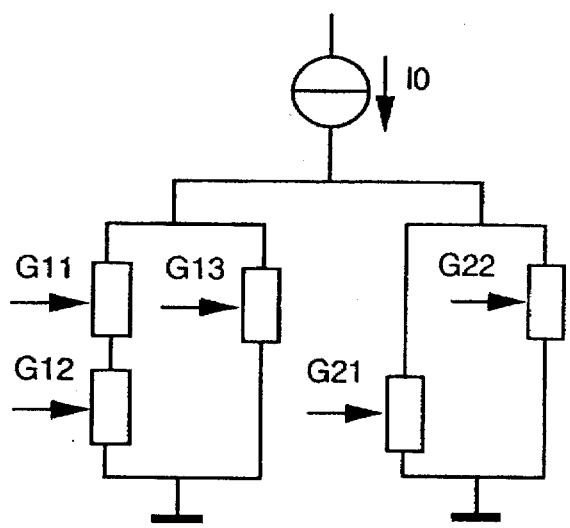
FIG. 4B is a diagram of a second embodiment of a network of resistive bipoles according to the present invention.

We have just described, with reference to FIG. 4A, an embodiment of a resistive network adapted to supply three currents, the intensities of which are representative of the degrees of truth or weight of three rules. According to the present invention, the fuzzy logic controller also has circuits for determining the value of the output variables from the currents supplied by the resistive network. Before describing these latter circuits, we will briefly describe a second example of a resistive network by referring to FIG. 4B. The resistive network of FIG. 4B is adapted to implement two rules having conditions connected by the term "OR".

In the case where the fuzzy logic expression containing the conditions of a rule has "OR" terms amongst some of these conditions, the resistive elements associated with a rule are not all in series. FIG. 4B shows an example of circuits for supplying two currents, the intensities of which are representative of the weights of two rules having, respectively, a fuzzy logic expression of the form:

$$(X_1=a_{11} \text{ AND } X_2=a_{12}) \text{ OR } X_3=a_{13}$$

and a fuzzy logic expression of the form:

$$X_1=a_{21} \text{ OR } X_2=a_{22}$$

In the resistive network of FIG. 4B as well as in that of the preceding example, the resistive elements corresponding to the various conditions of a same rule are interconnected so as to form a single resistive bipole or, in other words, a single branch of the network of resistive elements. Nonetheless, contrary to what was the case in the example of FIG. 4A, in FIG. 4B, some of the resistive elements associated with the same rule are connected in parallel. Indeed, in the same bipole, the connections in parallel correspond to "or" terms and the connections in series to "and" terms.

The FIGS. 4A and 4B which have just been described represent respectively two resistive networks, each having a network of resistive bipoles in parallel, this latter network being disposed in series with a current source. The person skilled in the art will nonetheless understand that, in other embodiments of the present invention, each of these circuits could be replaced by its dual circuit. Under these conditions, a resistive network would have a network of resistive bipoles in series, this latter network being disposed in parallel with a voltage source.

We will now revert to the variant of the controller which is shown in FIG. 3. This variant has circuits according to the invention for determining the value of the output variables as a function of the currents supplied by the resistive network.

As shown in FIG. 3, each of the branches 21, 22 and 23 of the resistive network is connected to four signal collecting lines references 25, 26, 27 and 28 respectively and to an grounded line (or dump line) reference 30. The connection between each of the branches of the resistive network and the collecting lines is effected via the intermediary of a current dividing circuit. In the present example, each of the current dividing circuits comprises four equal conducting branches which are connected together to one of the outputs of the resistive network. The three current dividing circuits have the references 31, 32 and 33 respectively.

Figure 5:
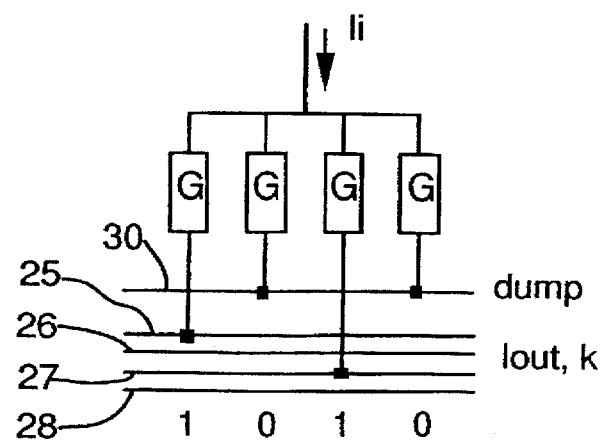
FIG. 5 is a partial representation of the second means of the controller of FIG. 3 showing the collecting lines and the dividing circuit.

For ease of comprehension we will now refer to FIG. 5 which shows in isolation one of the three current dividing circuits of FIG. 3 and the interconnections thereof with the four collecting lines 25, 26, 27 and 28 and with the dump line 30.

The current dividing circuit of FIG. 5 has four branches, one for each of the collecting lines 25, 26, 27 and 28. In one embodiment of the invention, there can be any number of collecting lines, but the current dividing circuits always have one branch per collecting line.

With reference to FIG. 5, this shows a resistive element on each of the four branches of the current dividing circuit. These resistive elements all bear the reference letter G and, in addition, all have the same conductance. Since each branch of the current dividing circuit has the same conductance, the current dividing circuit divides the current supplied by one branch of the resistive network into four equal parts, provided the potentials of the collecting lines are equal.

Each branch of the current dividing circuit is associated with one of the collecting lines, but is adapted to be connected either to this collecting line, or to the dump line. In concrete terms in FIG. 5, the first branch from the left of the current dividing circuit is associated with the collecting line 25 to which it is connected, the second branch is associated with the line 26, but is not connected thereto, the third branch is associated with the line 27 to which it is connected and, finally, the last branch is associated with the line 28, but is not connected thereto.

The fact of the branches of the current dividing circuit being connected, or not being, connected to the collecting lines attributes to each branch a binary value 1 or 0 which will be designated $c_k$. A current dividing circuit having four branches is therefore characterised by a word of four bits. For example, the word of four bits characterising the current dividing circuit of FIG. 5 is 1010.

Reverting once again to the diagram of FIG. 3, it will be seen that the current dividing circuits associated with each of the three rules are each characterised by a different binary word. The total current $I_{out,k}$ supplied by the three current dividing circuits to a specific collecting line k is equal to:

$$I_{out,k} = \sum_i C_{ik} 1/N I_i = 1/N \sum_i C_{ik} I_i = \frac{I_o}{N} \cdot \frac{\sum_i C_{ik} \cdot G_i}{\sum_i G_i} ;$$

N being the number of current dividing branches
The current $I_i$ being equal to $$I_o \cdot G_i / \sum_i G_i$$

the relationship between, on the one hand, the total current supplied to the $k^{th}$ collecting line and, on the other hand, the quarter or, more generally, the 1/N of the total current $I_o$ is therefore equal to the centre of gravity of the $c_k$ corresponding to the three rules and the weights of which are the respective weights of the rules.

It will therefore be understood that the current supplied to the $k^{th}$ collecting line corresponds to the evaluation of the global output value of the three associated rules each having as single output value one of the values 1 or 0. Similarly, the current intensities in the four collecting lines correspond to the global output values for three associated rules each having four distinct binary output values.

The four binary output values which are determined by the connections of the current dividing circuit associated with each rule can, according to the present invention, either be considered as four binary numbers having one bit, or as one binary number having four bits, or also as two or three binary numbers of intermediate size.

In the variant shown in FIG. 3, the output values of the three rules are each considered to be binary numbers having four bits. For this purpose each of the collecting lines 25, 26, 27 and 28 is, in FIG. 3, connected to one of the inputs 35, 36, 37 and 38 of a second network of resistances. This network, which constitutes a weighting circuit by powers of 2 known per se, is shown in isolation in FIG. 6.

Figure 6:
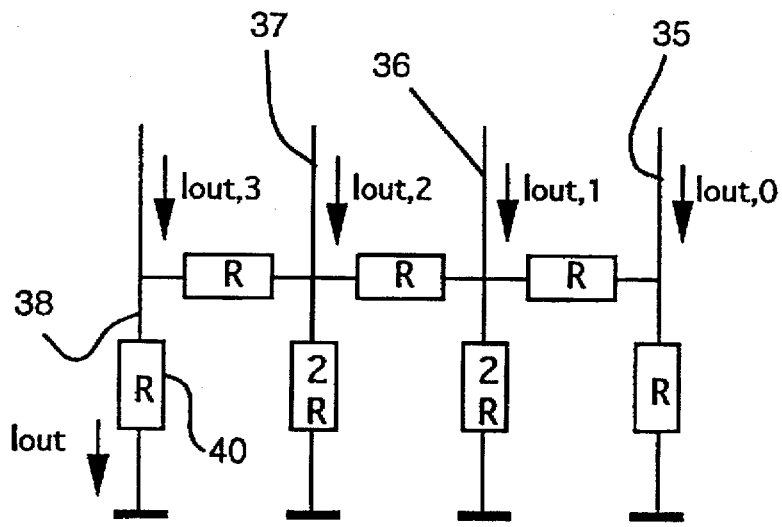
FIG. 6 is a partial representation of the second means of the controller of FIG. 3 showing the means for effecting a weighted sum of the currents conducted by the collecting lines.

It will be seen from FIG. 6 that the four inputs of the second network of resistances each correspond to one node.

These nodes have the references 35, 36, 37 and 38 respectively. The four nodes are connected to each other by three resistances all having the same arbitrary value shown as R in the figure, and each of the nodes is also connected to ground by the intermediary of a resistance having either the value R or the value 2R.

To make FIG. 6 easier to understand, the current supplied by the collecting line 25 to the node 38 is indicated by the reference $I_{out,3}$, the current supplied by the line 26 to the node 37 is indicated $I_{out,2}$, the current supplied by the line 27 to the node 36 is indicated $I_{out,1}$ and, finally, the current supplied by the line 28 to the node 35 is indicated $I_{out,0}$.

We will now consider the current with reference $I_{out}$ which circulates between the node 38 and ground across the resistance of value R which has the reference 40 in FIG. 6. It may easily be verified that the intensity of this current is equal to:

$$I_{out} = \frac{2}{3}(\tfrac{1}{8}I_{out,0} + \tfrac{1}{4}I_{out,1} + \tfrac{1}{2}I_{out,2} + I_{out,3})$$

The current $I_{out}$ is thus proportional to a sum of the currents supplied to the four collecting lines, this sum being weighted by successive powers of 2.

The effect of the second network of resistances is thus to transform four currents each representing the centre of gravity of three binary numbers of one bit into a single current, the intensity of which represents the centre of gravity of three binary numbers of four bits.

It is because of the linearity of the operator of centre of gravity that the intensity of the output current $I_{out}$ supplied by the second network of resistances is identical to that which one would obtain by converting in each rule the binary number characterising the output of the rule into analog current and by then determining the centre of gravity of these analog currents.

We have stated earlier that each current dividing circuit divided the current which it receives into four equal parts. As we have already stated, this is only true if the four collecting lines 25, 26, 27, 28 and the dump line 30 are all at the same potential. Unfortunately, because the collecting lines are connected to the inputs of the second network of resistances and, moreover, do not conduct the same amount of current, they are not, in general, at exactly the same potential.

To overcome the above problem, it may be useful to insert a current conveyer between each collecting line and the input of the second network of resistances. The principle of operation of current conveyors is known to the person skilled in the art, but it may nevertheless be stated that a detailed description of these elements appears in chapter 3 of the work by C. Toumazou, F. J. Lidgey and D. G. Haigh; "Analog IC design: the current-mode approach" published by Peter Peregrinus Ltd.; London; United Kingdom. By using current conveyors (not shown in the figures), the collecting lines are maintained at a virtual ground.

Instead of having recourse to current conveyors, it is generally easier to choose a sufficiently small value R for the resistances of the second network of resistances (described in connection with FIG. 6), so that the voltage drop in the second network of resistances can be neglected and that the collecting lines are therefore substantially grounded.

Figure 7:
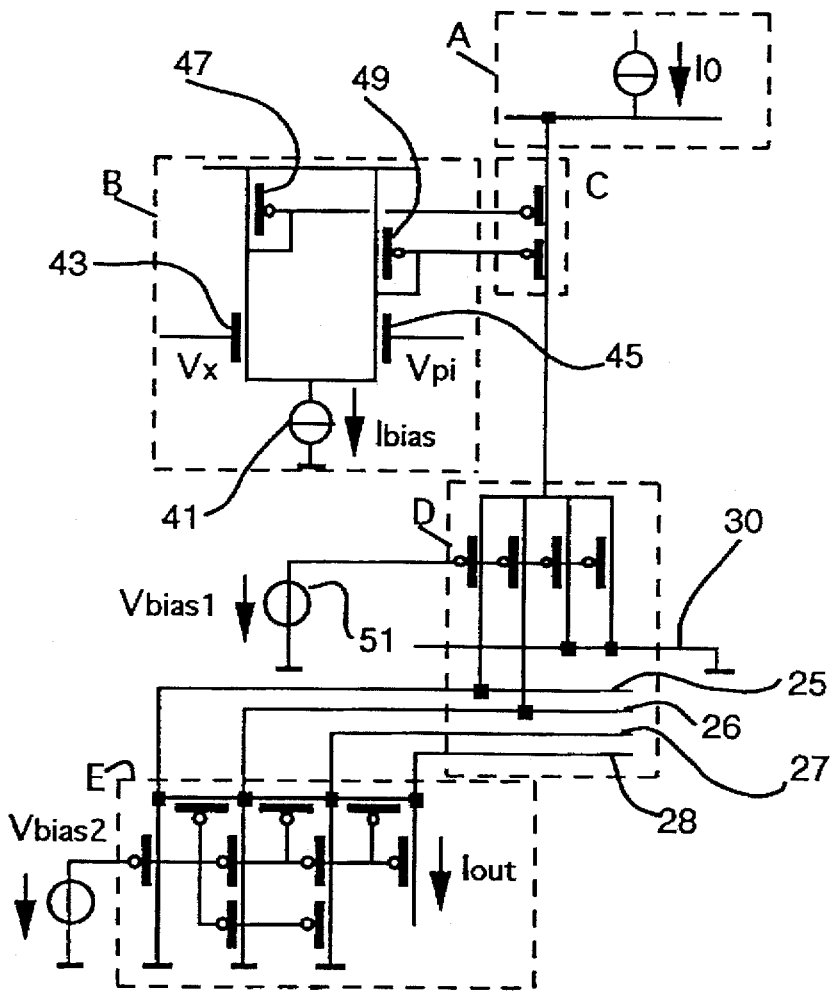
FIG. 7 is an electronic diagram of a second embodiment of the present invention.

FIG. 7 shows a second embodiment of a fuzzy logic controller according to the present invention. This second embodiment uses MOS transistors instead of and in the place of the resistive elements of the first embodiment. The essential features of the diagram of FIG. 7 are obtained by replacing each of the conductances of the diagram of FIG. 3 by an MOS transistor in conformity with the principle of pseudo resistance. For more details on the behaviour of pseudo-conductances of interconnected transistors, reference may be made to the article by E. Vittoz and X. Arreguit, "Linear networks based on transistors", Electronic Letters, 297, 29, (1993).

To avoid overloading the diagram, FIG. 7 only shows the circuit elements needed to implement a single rule. In addition, the diagram only shows the circuit elements needed to evaluate a single membership function, that is a single condition of the rule.

The circuit of FIG. 7 is subdivided into five circuit elements or modules. These modules have the references A, B, C, D and E respectively and are each delimited by a rectangle of broken lines on the diagram.

Module A comprises the current source. This current source may be identical to that of the embodiment of FIG. 3. This module is unique, independent of the number of rules.

Module B is an evaluation circuit of an appertaining function or, in other words, a circuit which effects a measurement of the degree of similarity between the value of an input signal Vx and a given reference value $Vp_i$. FIG. 7 only shows a single evaluation circuit of an appertaining function, but it is clear that there must be one thereof for each condition of each implementing rule.

Module C is composed of two transistors in series which, when they are commanded by the module B, together constitute a pseudo-resistive element of variable conductance. The conductance of module C is zero if the value of the input signal is very different from the reference value, rises continuously when the two values approach each other and reaches a maximum value when the two values are identical. FIG. 7 shows only a single element pseudo-resistive to variable conductance. It is, nonetheless, clear that there is one of these elements for each evaluation circuit of an appertaining function and that, in addition, these pseudo-resistive elements form a network. The reader will be able to refer to FIGS. 3 and 4 to determine how the pseudo-resistive elements must be interconnected.

Module D is composed of four collecting lines, a dump line and a branching circuit, the function of which is to distribute the parts of the current supplied by one of the branches of the network of pseudo-resistive elements to the collecting lines. The circuit of module D is identical to that of FIG. 5 as from the instant where each of the conductances of this latter circuit is replaced by an MOS transistor. It will also be understood that, although module D is shown as only having a single branching circuit it, in fact, has one per implemented rule, in other words, one per branch of the pseudo-resistive network.

Finally, module E is composed of a circuit to effect a sum of currents weighted to the power of 2. The circuit of module E is identical to the network of resistances of FIG. 6 as from the instant when each of the resistances of this network is replaced by an MOS transistor (except for the two resistances of double value which, for their part, are replaced by a pair of MOS transistors in series). It will be understood that module E is also unique, independent of the number of rules.

As already stated, the module with reference B is an evaluation circuit of an appertaining function. This module has a current source, reference 41, which feeds two parallel branches. The first of these branches has two transistors in series, references 43 and 47 respectively, and the other branch has two other transistors references 45 and 49 respectively.

The input value for the evaluation circuit is a voltage designated $V_x$ which is supplied to the gate of the transistor 43, whereas the reference value of the circuit is a voltage designated $V_{pi}$ which is supplied to the gate of the transistor 45. The current circulating in each of the two differential branches presents a sigmoid dependence on the differential voltage applied.

It will also be noted, in FIG. 7, that the gates of the two transistors of module C are connected, respectively, to the gates of the transistors 47 and 49. Under these conditions, provided the current supplied by module A to module C is sufficiently weak for the two transistors of module C to be in weak inversion, the pseudo-conductance of module C reaches its maximum when $V_x$ is equal to $V_{pi}$ and decreases towards zero when the deviation between the two parameters increases. For further details regarding the behaviour of pseudo-conductances of interconnected transistors, reference may be made to the article by E. Vittoz and X. Arreguit, "Linear networks based on transistors", Electronic Letters, 297, 29, (1993) already mentioned earlier.

The pseudo-conductance of the transistors of block D is determined by a bias voltage which is designated Vbias1 and which is delivered by a voltage source reference 51.

The pseudo-conductance of the transistors of block E is determined by a bias voltage which is designated Vbias2 and which is delivered by a voltage source reference 53.

Through careful choice of the values of the bias voltages $V_{bias1}$ and $V_{bias2}$, it is possible to dispense with the current conveyors which were mentioned in connection with the embodiment of FIG. 3. Indeed, although with true resistances it is necessary to maintain all the collecting lines at the same constant potential, with pseudo-resistances it suffices if the potentials of these collecting lines are sufficiently low to saturate the transistors of module D. For further details on the principle of pseudo-ground connected to pseudo-resistances, reference may be made to the already mentioned article by E. Vittoz and X. Arreguit, "Linear networks based on transistors", Electronic Letters, 297, 29, (1993).

I claim:

1. An analog type fuzzy logic controller adapted, by implementing a set of rules and as a function of the values from a set of input variables ($X_k$), to supply the values of a set of output variables ($Y_j$), each of said rules expressing itself as, on the one hand, a result consisting in the association of predetermined values ($a_{ij}$) with at least part of said output variables ($Y_j$) and, on the other hand, a fuzzy logic expression composed of one or several conditions connected to each other by logic operators, said conditions each consisting of an expression involving one of said input variables ($X_k$) and a reference value ($P_{ik}$), said controller determining the values ($I_{out}$) of said output variables ($Y_j$) by combining said predetermined values ($a_{ij}$) of the conclusions of the various rules, the predetermined values ($a_{ij}$) of each of said conclusions being weighted by taking into account an overall degree of truth ($\mu_i$) of the corresponding fuzzy logic expression, said overall degree of truth being determined by combining the respective degrees of truth of the conditions appearing in said fuzzy expression and said degree of truth of one condition being maximum when said condition is strictly verified and zero when said condition is considered as non-verified; said controller comprising:

first means for supplying for each rule a current ($I_i$), the intensity of which is representative of the overall degree of truth ($\mu_i$) of the fuzzy logic expression of said rule, and second means for determining the values of said output variables ($Y_j$) from said current intensities ($I_i$) supplied by said first means for the various rules; wherein the first means of said controller have:

a network of parallel resistive bipoles, said network being disposed in series with a current source and each of said bipoles being associated with one of said rules, said bipoles each being moreover composed of a set of resistive elements interconnected in series and in parallel, the configuration of the interconnections of said resistive elements in a bipole being determined by the nature of the logic operators ("AND", "OR") present in the fuzzy logic expression of the rule associated with said bipole, a plurality of evaluation circuits of the degree of truth of a condition, each of said circuits being adapted to command the conductance of one of said resistive elements in such a way that the relative current intensities ($I_i$) circulating in the various branches (21,22,23) of said network resistive bipoles reflect the distribution of the overall degrees of truth of the various rules.

2. A controller according to claim 1 wherein said second means have:

a given number (N) of collecting lines for each rule, a current dividing circuit having said given number (N) of branches, each of said branches receiving an equal share of the current supplied by said first means and each of a selection of said branches being connected to one of said collecting lines, said selection of branches expressing said predetermined values ($a_{ij}$) appearing in the conclusion of said rule.

3. A controller according to claim 2, wherein said second means also comprise means for realising a sum of currents conducted by at least part of said collecting lines, said sum being a sum weighted by successive power of 2.

4. An analog type fuzzy logic controller adapted, by implementing a set of rules and as a function of the values taken from a set of input variables ($X_k$), to supply the values of a set of output variables ($Y_j$), each of said rules expressing itself as, on the one hand, a result consisting in the association of predetermined values ($a_{ij}$) with at least one part of said output variables ($Y_j$) and, on the other hand, a fuzzy logic expression composed of one or several conditions connected together by logic operators, said conditions each consisting of an expression involving one of said input variables ($X_k$) and a reference value ($P_{ik}$), said controller determining the values ($I_{out}$) of said output variables ($Y_j$) by combining said predetermined values ($a_{ij}$) of the conclusions of the various rules, the predetermined values ($a_{ij}$) of each of said conclusions being weighted, taking into account an overall degree of truth ($\mu_i$) of the corresponding fuzzy logic expression, said overall degree of truth being determined by combining the respective degrees of truth of the conditions appearing in said fuzzy expression and said degree of truth of a condition being maximum when said condition is strictly verified and zero when said condition is considered non-verified; said controller comprising:

first means for supplying for each rule a current ($I_i$), the intensity of which is representative of the overall degree of truth ($\mu_i$) of the fuzzy logic expression of said rule, and second means for determining the values of said output variables ($Y_j$) from said current intensities ($I_i$) supplied by said first means for the various rules;

said first means of said controller having:

a network of series resistive bipoles, said network being disposed in parallel with a voltage source and each of said bipoles being associated with one of said rules, said bipoles each being moreover composed of a set of resistive elements interconnected in series and in parallel, the configuration of the interconnections of said resistive elements in a bipole being determined by the nature of the logic operators ("AND", "OR") present in the fuzzy logic expression of the rule associated with said bipole, a plurality of evaluation circuits of the degree of truth of a condition (11,13), each of said circuits being adapted to command the conductance of one of said resistive elements in such a way that the relative values of the currents at the terminals of the various resistive bipoles reflect the distribution of the overall degrees of truth of the various rules.

5. A controller according to claim 4, wherein said second means have:

a given number (N) of collecting lines for each rule, a current dividing circuit having said given number (N) of branches, each of said branches receiving an equal share of the current supplied by said first means and each of a selection of said branches being connected to one of said collecting lines, said selection of branches expressing said predetermined values ($a_{ij}$) appearing in the conclusion of said rule.

6. A controller according to claim 5, wherein said second means also comprise means for realising a sum of currents conducted by at least part of said collecting lines, said sum being a sum weighted by successive power of 2.

7. An analog type fuzzy logic controller adapted, by implementing a set of rules and as a function of the values taken by a set of input values ($X_k$), to supply the values of a set of output variables ($Y_j$), each of said rules expressing itself as, on the one hand, a conclusion consisting in the association of predetermined values ($a_{ij}$) with at least one part of said output variables ($Y_j$) and, on the other hand, a fuzzy logic expression composed of one or several conditions connected together by logic operators, said conditions each consisting of an expression involving one of said input variables ($X_k$) and a reference value ($P_{ik}$), said controller determining the values ($I_{out}$) of said output variables ($Y_j$) by combining said predetermined values ($a_{ij}$) of the conclusions of the various rules, the predetermined values ($a_{ij}$) of each of said conclusions being weighted, taking into account an overall degree of truth ($\mu_i$) of the corresponding fuzzy logic expression, said overall degree of truth being determined by combining the respective degrees of truth of the conditions appearing in said fuzzy expression and said degree of truth of a condition being maximum when said condition is strictly verified and zero when said condition is considered non-verified; said controller comprising:

first means for supplying for each rule a current ($I_i$), the intensity of which is representative of the overall degree of truth ($\mu_i$) of the fuzzy logic expression of said rule, and second means for determining the values of said output variables ($Y_j$) from said current intensities ($I_i$) supplied by said first means for the various rules; said second means of said controller having:

a given number (N) of collecting lines for each rule, a current dividing circuit having said given number (N) of branches, each of said branches receiving an equal share of the current supplied by said first means and each of a selection of said branches being connected to one of said collecting lines, said selection of branches expressing said predetermined values ($a_{ij}$) appearing in the conclusion of said rule.

8. A controller according to claim 7, wherein said second means also comprise means for executing a sum of the currents conducted by at least one part of said collecting lines, said sum being a sum weighted to the power of 2.

* * * * *